March 3, 1959

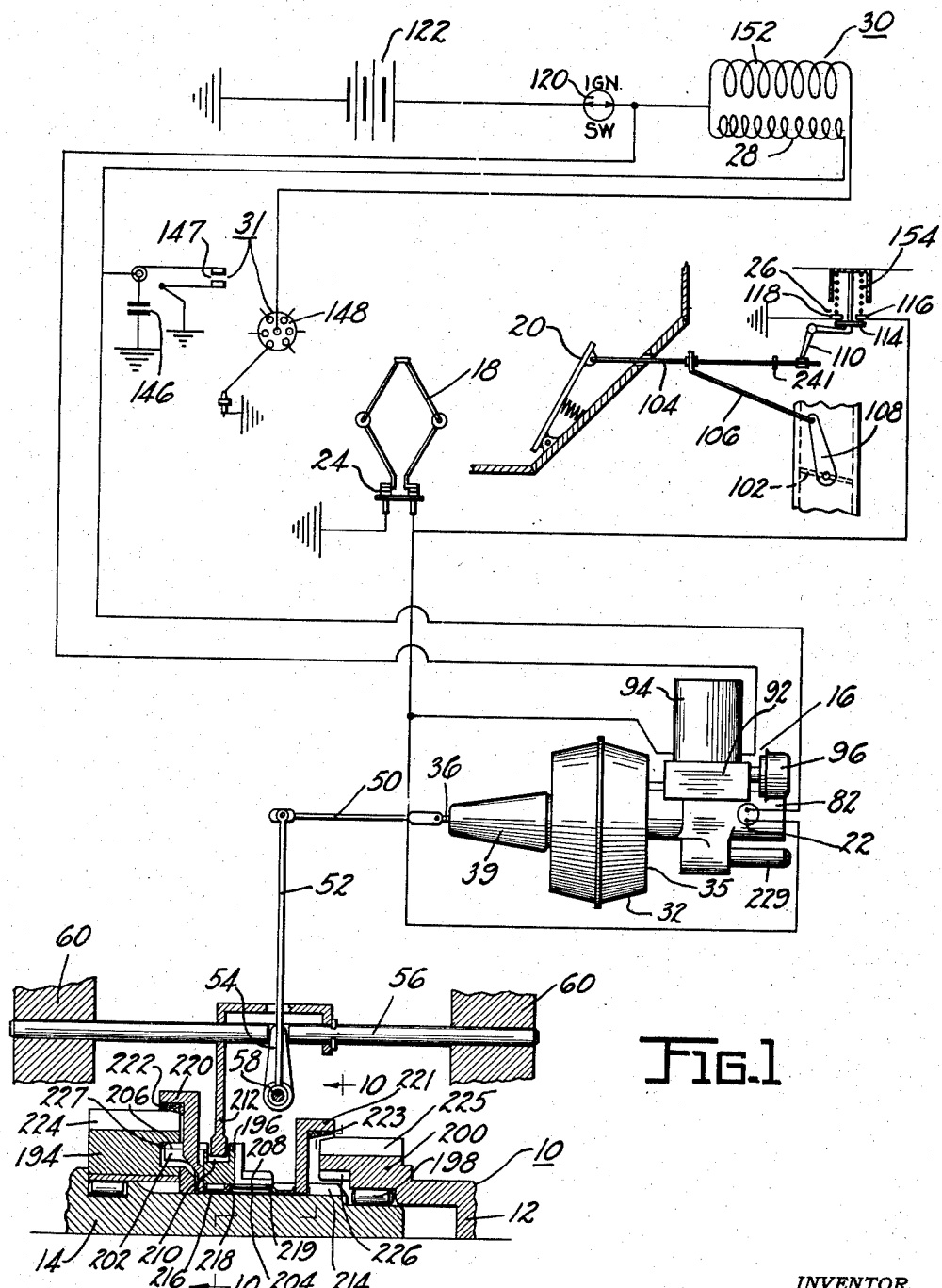

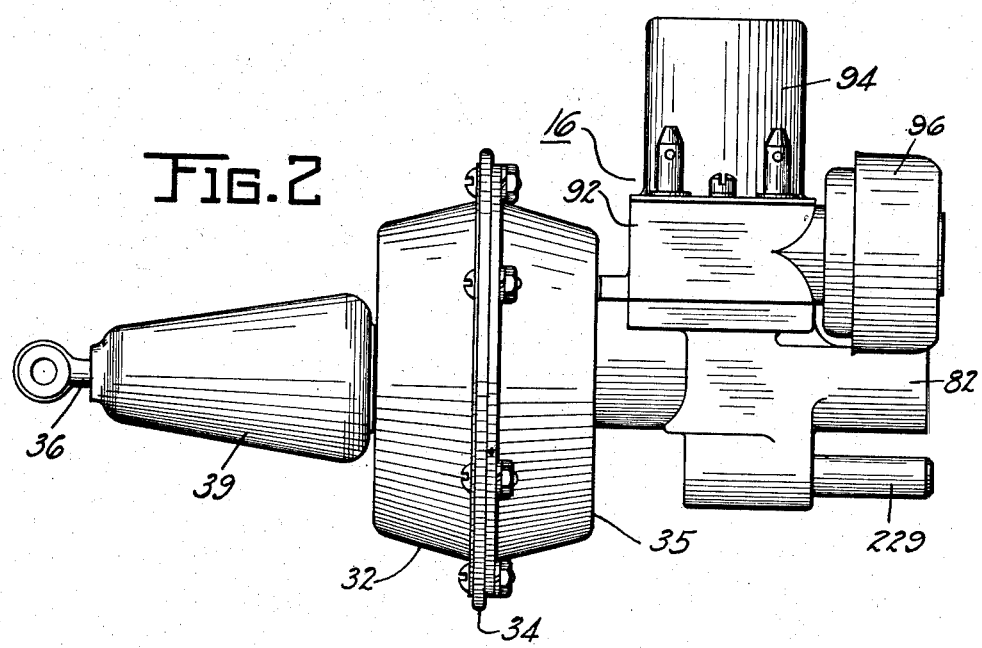
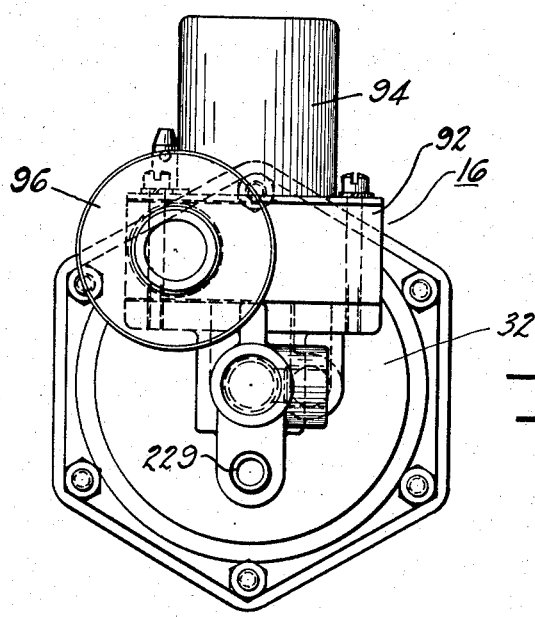

T. L. MAYRATH 2,875,633

POWER TRANSMISSION

Filed May 13, 1940

INVENTOR.
THOMAS L. MAYRATH
BY
H. Q. Clayton
ATTORNEY.

March 3, 1959
T. L. MAYRATH
2,875,633
POWER TRANSMISSION
Filed May 13, 1940
6 Sheets-Sheet 4
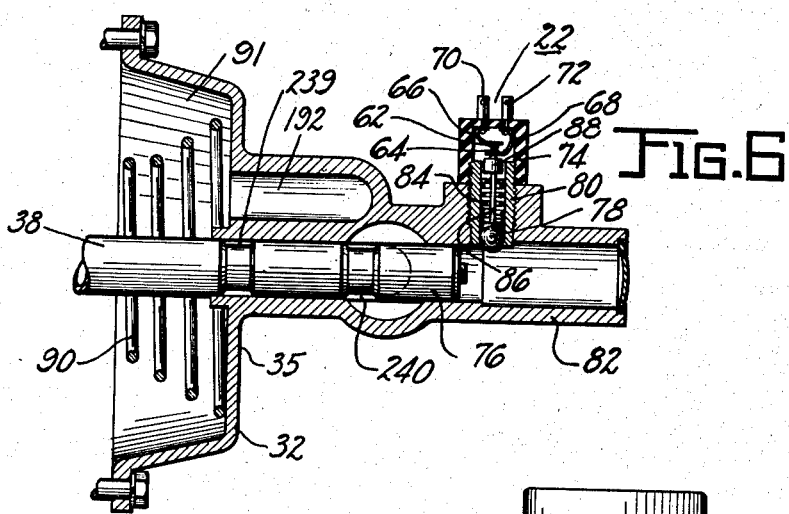
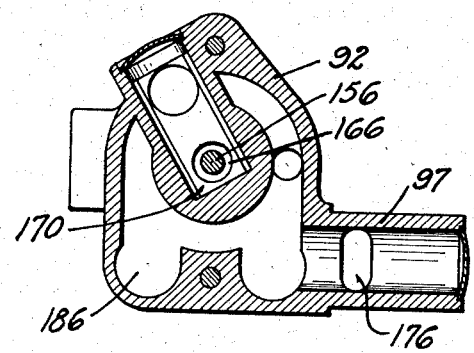
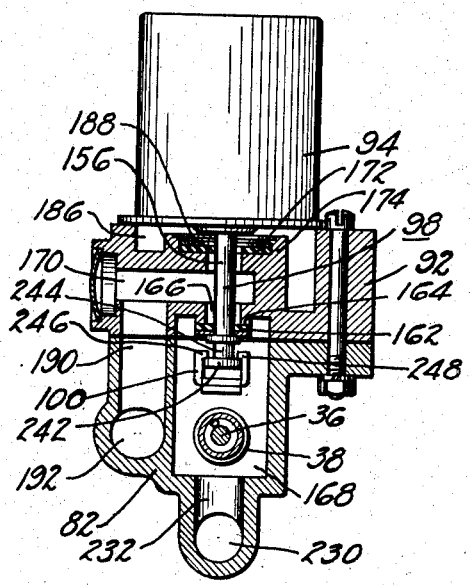
INVENTOR.
THOMAS L. MAYRATH
BY
ATTORNEY.

March 3, 1959
T. L. MAYRATH
2,875,633
POWER TRANSMISSION
Filed May 13, 1940
6 Sheets-Sheet 5
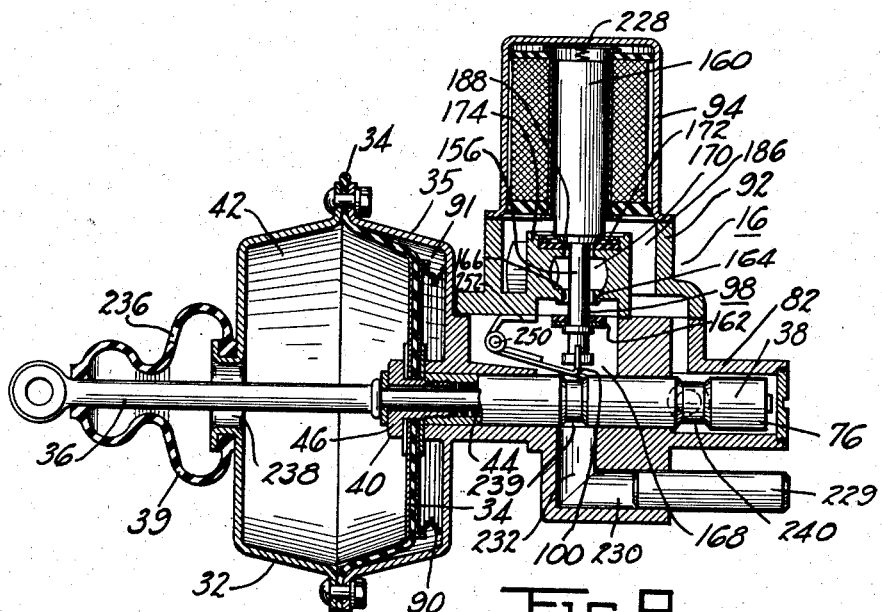
FIG.9
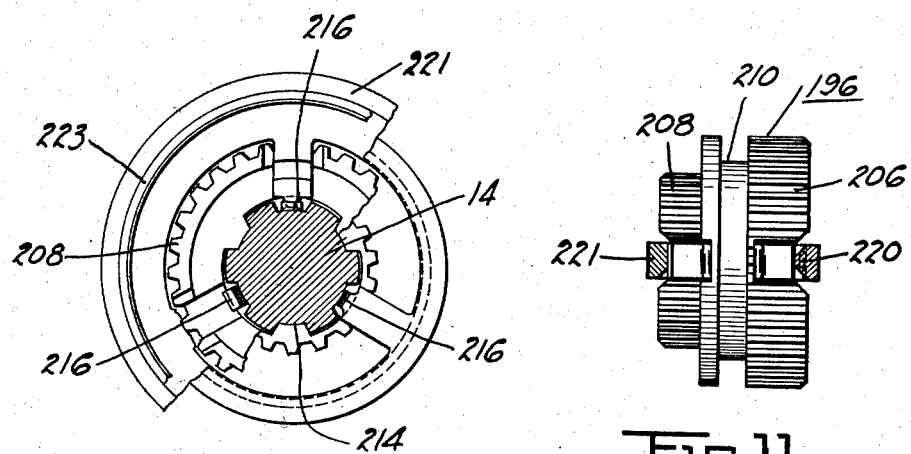
FIG.10
FIG.11
INVENTOR
THOMAS L. MAYRATH
BY
H. O. Clayton
ATTORNEY

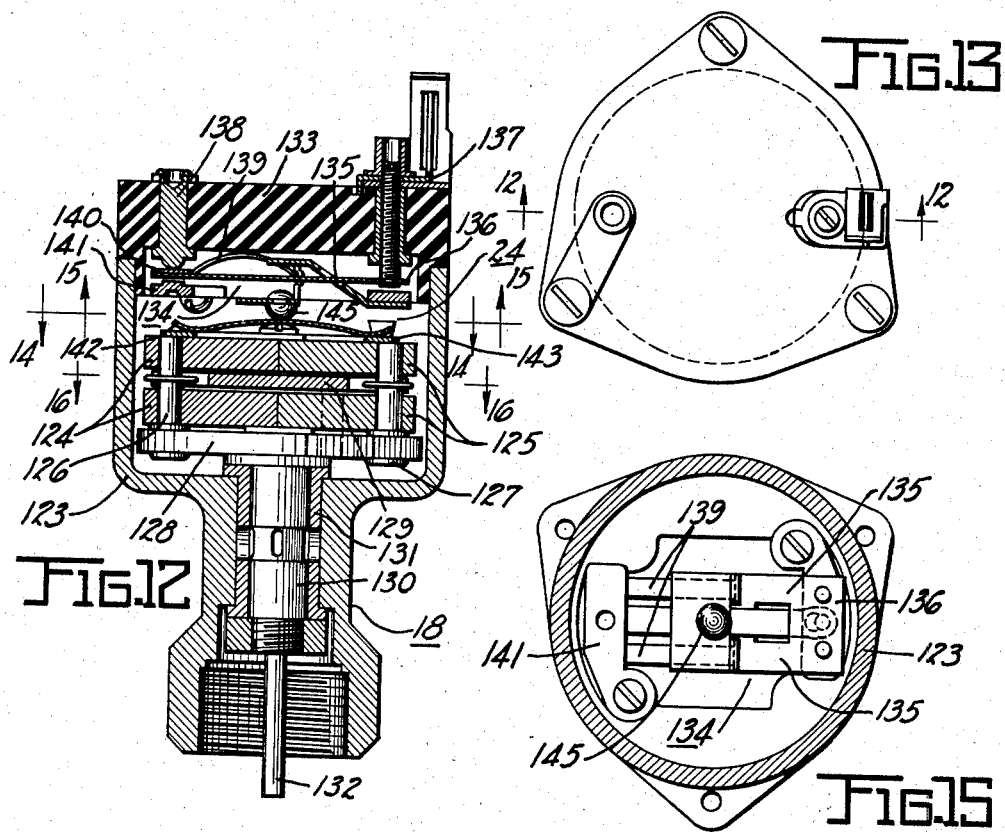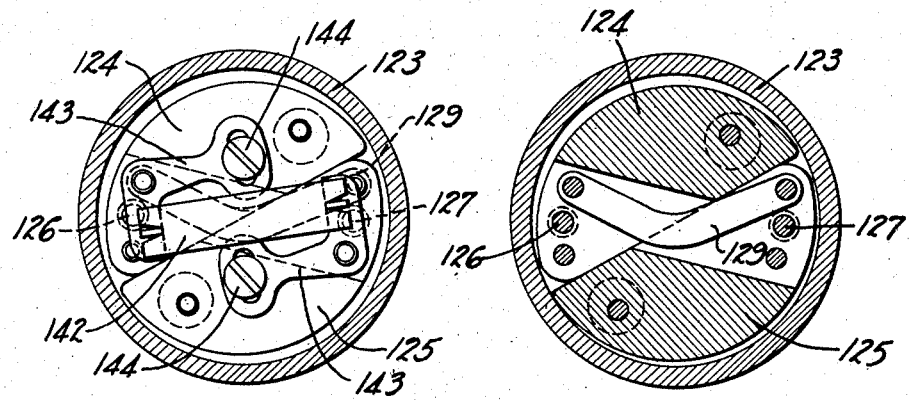

United States Patent Office 2,875,633
Patented Mar. 3, 1959

2,875,633

POWER TRANSMISSION

Thomas L. Mayrath, South Bend, Ind., assignor to Bendix Aviation Corporation, South Bend, Ind., a corporation of Delaware Application May 13, 1940, Serial No. 334,785

5 Claims. (Cl. 74—472)

This invention relates to motor vehicles and more particularly to improvements in the transmission of power from the engine to the driving wheels of a motor vehicle.

It is customary, in connection with the drive for motor vehicles, to provide a speed ratio changing transmission for varying the driving ratio between the engine and the vehicle driving ground wheels, and my invention is particularly directed to power means automatically operable, when the accelerator or other manually operated engine control means is manipulated to fully or substantially fully open the throttle, to cut out of operation the engine controlling ignition system as the transmission is being power operated to uncouple the engine of the vehicle and the driving wheels thereof and then to so operate the transmission as to lower the speed ratio between the engine and the driving ground wheels and to again render the ignition operative to effect a speeding up of the engine just prior to the completion of said operation of the transmission.

A further object of my invention is to include in the power transmission mechanism of the vehicle the aforementioned power means and a fluid coupling type of clutch, the latter serving to transmit the drive from the engine to the change-speed transmission. Thus by incorporating such a clutch it is necessary to operate but one control, that is, the accelerator, to effect the aforementioned speed ratio change.

It follows therefore that my invention is directed to means for automatically effecting a change in the transmission speed ratio at a time when the internal-combustion engine is incapable, at the then existing setting of the transmission and despite a fully opened position of its throttle, of either maintaining or increasing the speed of the vehicle. Such a lowering of the speed ratio will also probably prevent a choking of the engine should the vehicle be climbing a steep hill.

A further object of the invention is to provide, in an automotive vehicle provided with an internal-combustion engine and a selective gear change-speed transmission, power means operable, at or below a predetermined vehicle speed or after the engine throttle has been moved to its wide open position, to successively disable the ignition system of the engine to facilitate a de-meshing of the transmission gears, initiate and substantially complete an operation of the transmission to mesh another set of gears and thereby lower the driving ratio between the engine and the ground wheels of the vehicle and then again render the ignition system operative to speed up the engine just prior to the meshing of the gears. The power means is subsequently operative, after the throttle has been fully closed or substantially closed and only after such a closure, to so operate the transmission as to increase the aforementioned driving ratio.

In carrying out the above objects of my invention I have, in a preferred embodiment of my invention, provided a simple and compact pressure differential and spring operated double-acting motor and control valve unit, the control valve being operated by a solenoid controlled either by an accelerator actuated switch or by a governor operated switch, and the motor, when energized by the spring, serving first to take up slack in the connection between the power element of the motor and the transmission, then disable the ignition system of the engine by closing a switch and at the same time initiating an operation of the transmission operating means to lower the gear ratio setting of the transmission and lastly to open said latter switch to render the ignition system operative just prior to the completion of said transmission operation. In this preferred embodiment of my invention the aforementioned spring is housed within the casing of the motor, and the valve operating solenoid also operates a latch, serving to maintain the power element of the motor in one of its two transmission operated positions until the accelerator is so positioned as to initiate the other transmission operating operation of the motor.

Yet another object of my invention is to provide a compact transmission operating and ignition controlling motor unit, said unit including switch operating means operated by the power element of the unit and so shaped and positioned with respect to a switch mounted on said unit as to effect certain closing and opening operations of the switch in timed relation with the operation of the transmission. In the aforementioned preferred embodiment of my invention, the aforementioned means consists of a switch operating plunger member having a slotted portion positioned to permit the aforementioned switch to open when the power element of the motor is in its high speed position.

Yet another object of my invention is to so construct the connection between the transmission and the power element of a transmission operating motor as to facilitate an operation of the synchronizer mechanism of the transmission, and in the aforementioned embodiment of my invention said connection includes a spring housed within a hollow rod connected to said power element.

My invention also contemplates the provision, in an automotive vehicle provided with an internal-combustion engine, a manually and power operated change-speed transmission mechanism and two clutches, one of the fluid type and the other of the friction type, interconnecting the engine and the transmission, of power means operative, either after the engine throttle has been moved to its wide open position or the speed of the vehicle is below a predetermined factor, first to take up slack in the connection between the power element of the power means and the transmission, then initiate an uncoupling operation of the transmission and at the same time cut the engine ignition system out of operation, thereby facilitating said uncoupling operation by reversing the driving torque in the power transmission system, and lastly to effect an operation of the change-speed transmission to lower the driving ratio between the engine and the vehicle driving wheels and concurrently render the ignition system operative to facilitate the operation of the transmission.

Yet another object of the invention is to provide, in an automotive vehicle, an ignition and transmission operating power means operative, after the accelerator is fully depressed, to successively disable the distributor and thereby disable the engine as the gears or equivalent driving and driven elements of the transmission are being uncoupled, then to continue the operation of the transmission to lower the driving ratio between the engine and the driving wheels and lastly to render the distributor operative to speed up the engine and facilitate the latter operation of the transmission, just prior to the completion of said operation. To so time the speeding up of the engine obviates an undesirable deceleration or surge of the vehicle.

A further object of my invention is to provide, in an automotive vehicle provided with an internal-combustion engine, an engine throttle operating accelerator and a step type or selective gear transmission, a single-motored power means for in part operating the ignition system of the engine and the transmission, said means being controlled by the accelerator.

In one of its broadest aspects my invention contemplates the provision, in an automotive vehicle, of a simple, inexpensive and effective mechanism for controlling the operation of the throttle and a fluid clutch, in part controlling the operation of the engine controlling ignition system and in part or completely controlling the operation of the change-speed transmission, there being but one manually operated control member for said mechanism.

Other objects of the invention and desirable details of construction and combinations of parts will become apparent from the following description of a preferred embodiment, which description is taken in conjunction with the accompanying drawings, in which:

Figure 1 is a diagrammatic plan view disclosing the transmission operating and ignition controlling system as a whole;

Figure 2 is a side elevation of the motor and valve unit of the transmission operating and ignition controlling power means of the invention;

Figure 3 is an end elevation of the motor and valve unit disclosed in Figure 2;

Figure 6 is a sectional view of the motor and valve unit, taken on the line 6—6 of Figure 5;

Figure 7 is a sectional view of the motor and valve unit, taken on the line 7—7 of Figure 5;

Figure 8 is a sectional view of the motor and valve unit, taken on the line 8—8 of Figure 4;

Figure 9 is a view similar to Figure 5, the parts of the mechanism being shown in their high gear positions;

Figure 10 is a sectional view of the transmission mechanism, taken on the line 10—10 of Figure 1;

Figure 11 is a top plan view of a part of the mechanism illustrated in Figures 1 and 10;

Figure 12 is a longitudinal view, taken on the line 12—12 of Figure 13 through the governor and the switch operated thereby;

Figure 4:
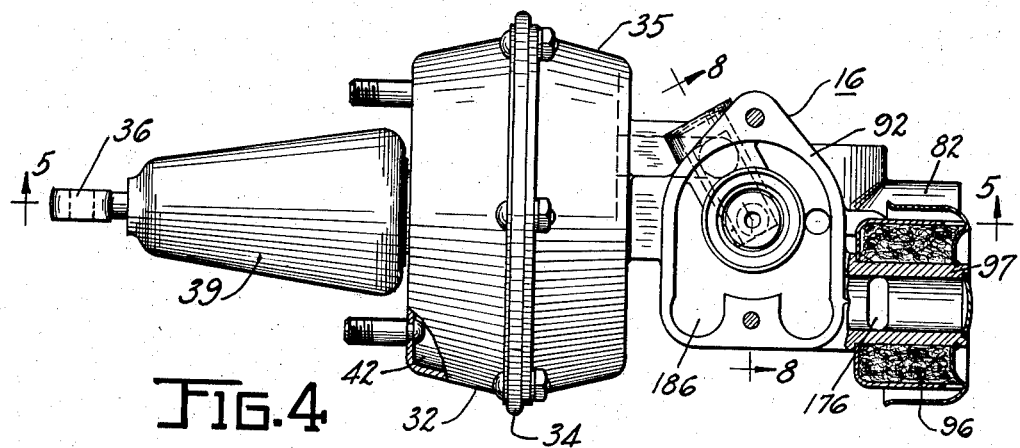
Figure 4 is a view of the motor and valve unit, the motor being disclosed in plan, the air cleaner in section and the valve and latch operating solenoid being omitted.

Figure 13 is a top plan view of the governor and switch unit disclosed in Figure 12; and Figures 14, 15 and 16 are sectional views of the governor and switch unit of Figure 12, taken respectively on the lines 14—14, 15—15 and 16—16 thereof.

Referring to Figure 1 of the drawings, diagrammatically disclosing a preferred embodiment of my invention, the reference numeral 10 indicates a power operated two-speeds forward selective gear transmission mechanism which may be placed ahead of or to the rear of a manually operated selective gear or so-called step type of transmission in the power transmission mechanism of an automotive vehicle; or the power operated transmission may be combined with the manually operated transmission as a single transmission unit. The manually operated step transmission may be omitted and the transmission 10, modified to include a manually operated reverse gear, may be combined with the rear axle mechanism of the vehicle to provide what is known in the art as a two-speed rear axle. If a manually operated step transmission is incorporated in the transmission system, then a manually or power friction clutch is included in said system.

The transmission 10 includes a drive shaft 12 and a driven shaft 14, and should said transmission be placed ahead of a manually operated transmission, not shown, then the drive shaft 12 is connected to a clutch, not shown, and the driven shaft is connected to the drive shaft of the manually operated transmission. Should the transmission 10 be placed to the rear of a manually operated transmission, then the drive shaft 12 is connected to the driven shaft of the latter transmission and the driven shaft 14 is connected to the propeller shaft of the vehicle.

My invention is, however, neither directed to the particular construction of the transmission disclosed in Figure 1 nor, as stated above, is it directed to the position of the transmission in the power transmission mechanism of an automotive vehicle; for my invention is directed to power means controlled either by the throttle controlling means or by a vehicle speed-responsive governor for operating any type of transmission that will alternately effect an increase and a decrease of the speed ratio between the engine and the driving ground wheels of the vehicle. The power means of my invention also serves to, in part, control the operation of the engine controlling ignition system to facilitate the operation of the change-speed transmission by said power means. It follows that inasmuch as the change-speed transmission of the vehicle is not limited to the transmission 10, disclosed in Figure 1, it is within the purview of our invention to employ a planetary transmission. However, we prefer to employ a selective gear type of two-speeds forward transmission with a manually operated selective gear transmission and a friction clutch interposed between the engine and said transmission in the power transmitting mechanism of the vehicle.

Preferably the transmission operating and ignition controlling power means of my invention is incorporated in an automotive vehicle equipped with a fluid coupling type of clutch for transmitting the drive from the internal-combustion engine of the vehicle to the change-speed transmission mechanism. Such a clutch, which is well known to those skilled in this art, constitutes a yieldable connection between the engine and the drive shaft of the change-speed transmission and at all times during the operation of the engine serves as a force-transmitting medium. Inasmuch as the clutch or coupling will slip until the speed ratio of the rotor and stator elements of the clutch is 1 to 1 and inasmuch as with such a clutch there is no clutch disengaging operation to be effected, it follows that the fluid clutch will facilitate an operation of the selective change-speed transmission mechanism to the rear of the clutch and it also follows that such a transmission may be simplified by reducing the number of driving ratio settings thereof. Accordingly, the change-speed transmission of the vehicle may be limited to the simple two-speed selective gear transmission 10 disclosed in Figure 1. However, to facilitate a starting of the vehicle when the same is, say, mired in soft ground or when, for any reason, the load to be driven is relatively heavy, the transmission 10 may be supplemented by a friction clutch and the aforementioned change-speed transmission mechanism, the latter being manually operated to select a relatively low speed ratio between the engine and the vehicle driving wheels or propeller shaft. Such a manually operated supplemental selective transmission may, after the friction clutch is disengaged, be adjusted to place the transmission in neutral, that is, disconnect the engine or other prime mover from the driving ground wheels. Such a neutral setting, in a vehicle provided with a fluid clutch, will obviate an undesired creeping of the vehicle after it has been brought to a stop and will also obviate a possible stalling of the engine should the viscosity of the oil or other power-transmitting medium of the clutch be unduly increased by cold weather.

Describing now the transmission operating and ignition controlling power means constituting the essence of our invention, the principal elements of the same are diagrammatically disclosed in Figure 1 and include a spring and pressure differential operated motor and valve unit 16 controlled either by a vehicle speed-responsive governor 18 or by the accelerator 20 of the vehicle. As will be described hereinafter, a motor operated or so-called interrupter switch 22, a grounded governor operated switch 24, a grounded accelerator operated switch 26, and wire interconnecting said switches with the primary winding 28 of an ignition coil 30 constitute electrical means operative to successively cut out and cut in a distributor 31 as a step-down operation of the transmission is being effected. The ignition coil and distributor constitute two of the principal parts of the engine controlling ignition system, which is of conventional design.

Figure 5:
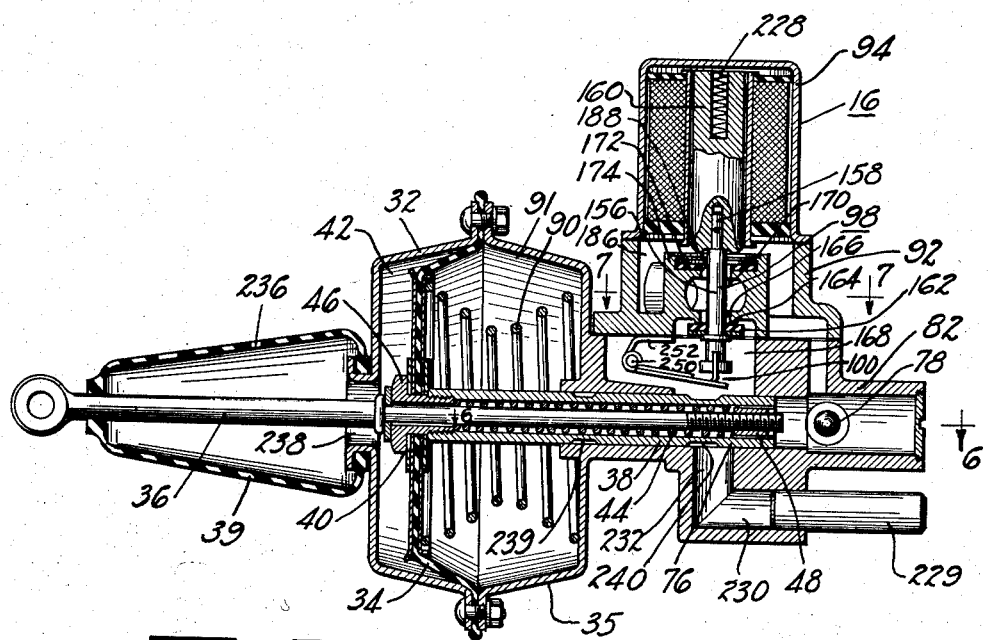
Figure 5 is a longitudinal sectional view of the motor and valve unit, taken along the line 5—5 of Figure 4, showing the parts of the mechanism in their low gear positions.

Referring to Figures 2–9 inclusive of the drawings, disclosing in detail the motor and valve unit 16, the same includes a two-part cylinder or casing 32 housing a flexible diaphragm 34, constituting the power element of the motor. The motor portion of the unit 16 is indicated by the numeral 35. A link 36, telescoped within a hollow rod 38 fixedly connected to the diaphragm at 40, is covered by a boot 39 to prevent foreign matter from entering a compartment 42 of the motor. A spring 44, sleeved over the end of the link 36, abuts, at one of its ends, a nut 46, constituting a part of the means for securing the diaphragm to the rod 38. At its other end, the spring 44 abuts a nut 48 threaded on the end of the link 36. Accordingly, the spring 44 serves to provide a yieldable connection between the diaphragm 34 and the link 36 to facilitate an operation of the synchronizer mechanism of the transmission, all of which will be described in greater detail hereinafter. The link 36 is connected, by pivotally connected links 50 and 52 and a crank 54, to a shift rail 56 of the transmission mechanism 10. The link 52 is secured to the crank 54 which is rotatably mounted upon a shaft 58 secured to the casing 60 of the transmission. The hollow rod 38 constitutes a power operated member operable to close the switch 22.

Referring to Figure 6, disclosing the details of the interrupter switch 22, the same includes contacts 62 and 64 secured to spring clips 66 and 68 respectively, the latter being secured to posts 70 and 72 mounted in a casing 74 of insulating material. This switch is closed by moving a full-bodied switch operating portion 76 of the hollow rod 38 into contact with a ball 78 housed within a bushing 80 threadedly mounted in a one-piece casing member 82 secured to one part of the two-part motor casing 32. When the ball 78 is forced upwardly against the tension of a return spring 84, the ball moves into contact with a stem 86 secured to the end of a cylindrically-shaped member 88 positioned beneath the contact 64. Accordingly, the interrupter switch is closed, when the full-bodied switch operating portion 76 of the hollow rod member 38 is moved into contact with the ball 78. A spring 90, housed within a motor compartment 91, serves as a power means to bias the diaphragm 34 to the position disclosed in Figure 5. To one side of the motor casing 32 there is secured the casing member 82 bored and recessed, as disclosed in Figures 5, 6 and 8, to provide air-transmitting ducts and recesses described hereinafter. Upon the top of the casing member 82 there is detachably secured a one-piece casing member 92, which is also constructed to provide air-transmitting ducts and recesses described hereinafter. A solenoid 94 detachably mounted upon the casing member 92, an air cleaner 96 secured to a tubular portion 97 of said member, a three-way valve indicated in general by the reference numeral 98, and a solenoid operated latch 100 complete the principal elements of the motor and valve unit 16.

Referring again to Figure 1, the accelerator 20 of the vehicle is operably connected to the throttle or so-called butterfly 102 of the carburetor mechanism by force-transmitting means including links 104 and 106 and a crank 108. One end of the link 104 is slidably mounted within the end of a bell crank lever 110, the latter serving, when rotated counterclockwise, to close the switch 26, which consists of a spring operated plate 114 and contacts 116 and 118. The accelerator operated switch 26, which is grounded as disclosed in Figure 1, is wired in series with the solenoid 94 and the ignition switch 120 of the vehicle, the latter being wired to a battery 122: accordingly, the switch 26 constitutes a part of the means for controlling the operation of the solenoid. The vehicle speed-responsive governor 18, disclosed in detail in Figures 12 to 16 inclusive, also serves as a part of the means for controlling the operation of the solenoid 94, said governor functioning to operate the switch 24 wired in series with the solenoid and the ignition switch and grounded as disclosed in Figure 1.

Referring to Figures 12–16 inclusive, the governor includes a casing 123 adapted to be secured to the chassis of the vehicle. Centrifugally operated mechanism of the governor is rotatably mounted within the casing, the same comprising two pairs of sector-shaped plates 124 and 125 tied together by pins 126 and 127 and secured to a plate 128 by said pins. To insure a properly synchronized movement of the plates 124 and 125, one pair of the same is preferably secured to the remaining pair by an angularly-shaped link 129, Figure 16. To the plate 128 is secured a shank 130 journaled in a bearing 131 constituting a part of the casing 123. A pin 132 projecting from the end of the shank is secured by means such as a Bowden connection drivably secured to the propeller shaft of the vehicle, not shown.

A housing 133 of the two-pole switch mechanism 134 is clamped to one end of the governor casing, said mechanism including a pronged one-piece contact member 135, Figures 12 and 15, of resilient material, a prong 136 of said member being clamped at one of its ends to a pole or contact 137 secured within the housing 133. The pole 137 is wired to the winding of the solenoid 94, the accelerator operated switch 26 and the interrupter switch 22, all as disclosed in Figure 1. The other end of the prong 136 is normally in yieldable contact with a pole 138 secured within the housing 133, said pole being wire to any convenient part of the chassis, serving as a ground connection. The prong 136, prongs 139, adjacent the prong 136 and the remaining parts of the one-piece contact member 135 are so preformed as to effect this contact. When the governor functions, as hereinafter described, an end portion 140 of the prongs moves downwardly into contact with a stop 141 secured to the housing 133. No claim to the switch is made herein, inasmuch as this mechanism and all of its essential elements or their equivalents are disclosed in McGall Patent No. 1,960,020, dated May 22, 1934.

Describing now the operation of the governor and switch mechanism, when the speed of the vehicle exceeds, say, 15 M. P. H. the sector-shaped plates 124 and 125 are moved outwardly, under the action of centrifugal force, to bend a yieldable member 142 secured to the weights by members 143. Members 143, which are angular in shape, are adjustably secured to the weights by screws 144, all as is disclosed in Figure 14. The member 142 moves into contact with a tab 145 secured to the one-piece contact member 135, said member being thereby flexed, as above described, to move its stop 141 away from contact with the pole 138 and into contact with the stop 141. The electrical circuit grounding the solenoid 94 is thus broken.

Describing now the ignition controlling electrical means, the interrupter switch 22 is wired in series with the grounded accelerator operated switch 26 and the primary coil 28 of the ignition coil 30. The distributor is diagrammatically disclosed in Figure 1 and is indicated in general by the reference numeral 31. This distributor, which is of conventional design, includes, of course, a grounded condenser 146, a breaker switch 147 and a rotor 148 wired to the several grounded spark plugs, only one of which is disclosed. As disclosed in Figure 1, the interrupter switch 22 is also wired in series with the grounded governor operated switch 24. Completing the description of the conventional ignition system disclosed in Figure 1, the primary winding 28 of an ignition coil 30 is wired in series with the ignition switch 120 and the breaker switch 147 of the distributor, and the secondary winding 152 of the ignition coil is wired in series with the rotor 148 and the ignition switch.

Describing now the operation of the mechanism constituting our invention, and incidentally completing the description of the details thereof, when the vehicle is at a standstill, the governor operated switch 24 is, of course closed, the end portion 140 of the contact member 135 is then in contact with the pole 138, and the accelerator operated switch 26 is open; for the accelerator 20 is at the time in its released position to permit a spring 154 to move the spring operated plate 114 of the switch 26 downwardly to the position disclosed in Figure 1. The closing of the governor operated switch 24 results in an energization of the solenoid 94, thereby moving the valve 98 upwardly to the position disclosed in Figure 5. This valve includes a cylindrical body member 156 having a pin 158 projecting from its upper end, said pin being housed within a recess in the lower end of an armature 160 and secured thereto. When the valve is drawn upwardly as just described, a flexible valve member 162 seats at 164 to cover an opening 166 interconnecting a recess 168 in the casing 82 with a rectangular-shaped compartment 170 in the casing 92, and the lower end of the armature 160 is moved away from a flexible member 172 housed within a recess in a cylindrically-shaped portion 174 of the casing 92. The valve having been moved upwardly, atmosphere is admitted to the compartment 91 of the two-part cylinder or casing 32 via air cleaner 96, a port 176 in a tubular portion 97 of the casing 92, a recess 186 in casing 92, an opening 188 interconnecting the recess 186 with the compartment 170, a vertically extending duct 190 in the casings 92 and 82 and, lastly, a laterally extending duct 192 in the casing 82 leading to the motor compartment 91. Now, at this time the spring 90 within the two-part cylinder or casing 32 is in its expanded position, Figure 5, to establish the low gear setting of the transmission 10.

Describing the transmission 10, the same includes the aforementioned drive shaft 12 and intermediate or driven shaft 14 and a countershaft not shown. The shaft 14 may be piloted as indicated at 198 in the shaft 12. A drive gear 200 on the shaft 12 meshes with a spur gear on the countershaft and another spur gear on the countershaft is in mesh with a second-speed gear 194. The countershaft and spur gears are not shown, inasmuch as the same constitute a part of a conventional transmission.

The gear 194 rotates in floating relationship upon the shaft 14. Mounted on the shaft 14, between the drive gear 200 and the second-speed gear 194, is a shiftable member 196, having on each of its sides and integral therewith clutch members 202 and 204 respectively, each formed with teeth indicated at 206 and 208 respectively, said member 196 being slidably splined to the shaft 14 as shown. An annular groove 210 may be formed in the member 196, in which is adapted to fit the shift fork 212 of the gear shift rail 56.

Assembled with the shiftable member 196 and located within the grooves of the splines 214 of the shaft 14 are spring fingers 216 having detents 218 and 219, which yieldably block the right and left movement of the shiftable member 196 with its clutch members 202 and 204 from a mid-way position between friction discs 220 and 221. These spring fingers 216, three in number, are spaced equidistantly around the shaft 14 as may be seen in detail in Figure 10.

The friction discs are secured to the opposite extremities of the spring fingers 216 and are also slidably splined to the intermediate or driven shaft 14, and in register respectively with the drive gear 200 and the second gear 194. These discs have conical friction faces 222 and 223 adapted to engage spur teeth 224 and 225 respectively of the gears 194 and 200.

The teeth 224 of gear 194, which mesh with the teeth of the spur gear on the countershaft have a portion of their outer surfaces shaped to closely receive the inner conical surface of the friction face 222 of the friction disc 220 so that by pressure of said friction face on the teeth 224 the driven shaft 14 may cause the shafts 12 and 14 to be synchronized as to speed.

On the gear 200 opposite and aligned with the jaw teeth 208 of clutch member 204 are fixed jaw teeth 226 adapted to be engaged with the teeth 208 of the shiftable member 196 to give positive clutch action.

The second-speed gear 194, like the gear 200, has its spur teeth 224 coned at one end to engage the friction surface 222 of the disc 220 and the clutch teeth 227 engage with the teeth 206 of the clutch member 202.

Continuing the description of the operation of the mechanism constituting our invention, to get the vehicle under way, the driver, of course, cranks the engine and then slowly depresses the accelerator to speed up the engine, the fluid clutch then transmitting the driving torque to the transmission mechanism. The speed of the vehicle is then probably increased sufficiently to render the governor 18 operative to open the switch 24, whereupon the solenoid 94 is deenergized and a spring 228 functions to move the armature 160 and the valve 98 connected thereto to the position disclosed in Figure 9. In this position, the compartment 91 of the motor 35 is connected to the intake manifold via a conduit, not shown, a nipple 229, ducts 230 and 232 in the casing 82, the recess 168 in casing 82, opening 166, compartment 170 and the aforementioned air-transmitting connections leading to said compartment. However, the accelerator 20 is at the time depressed to open the throttle, and the gaseous pressure within the manifold is therefore sufficiently high to prevent a withdrawal of air from the motor, which would result in a movement of the diaphragm 34 to the right. Accordingly, the two-part casing or cylinder 32 is not energized and the transmission 10 remains in its low gear position until the vehicle reaches the desired speed, whereupon the driver will release the accelerator. Now, when the accelerator has been released, say, three-fourths of its throw, the manifold vacuum will be increased sufficiently to energize the motor 35; for when the accelerator is released to the aforementioned position or beyond this position to its fully closed position, the throttle 102 is proportionately closed and the pistons of the internal-combustion engine, acting as a pump, evacuate the intake manifold sufficiently to effect this result.

Describing the energization of the motor, air is sucked from the compartment 91 of the motor into the then partially evacuated intake manifold, the compartment 42 of the motor being at the time vented to the atmosphere via an opening 236 in the boot 39 and an opening 238 in the two-part cylinder or casing 32. Accordingly, the diaphragm 34 will then be subject to a differential of pressures, resulting in its movement to the right to the position disclosed in Figure 9. Now, when the diaphragm reaches this position, the latch 100 moves downwardly into a groove 239 in the hollow rod 38 and remains in this position to lock the member 38 in the position disclosed in Figure 9. The member 38 is also provided with a groove 240 for a purpose to be described hereinafter, and when said member reaches the position disclosed in Figure 9 the ball 78 of the switch 22 lies within said groove to effect an opening of said switch. The movement of the diaphragm to the right serves to move the fork 212 to the right by means of the shift rail 56.

The motion of the fork 212 is transmitted to the shiftable member 196, which in turn urges the disc 221 with its conical friction face 223 against the teeth 225 through the instrumentality of the spring fingers 216. This movement of the disc 221, which causes engagement between the teeth 225 and friction face 223 results in a synchronization of the shafts 12 and 14. Further movement of the shiftable member 196 results in the depression of detent 219, thereby to permit the teeth 208 of the slidable clutch member 204 to pass through the disc 221 and to engage with the jaw teeth 226 of the gear 200, thus to produce a positive two-way drive.

The closing of the engine throttle, serving to very substantially reduce the engine driving torque, facilitates this operation of the transmission, that is, the demeshing of the clutch 202 and the second-speed gear 194, and the synchronization and meshing of the drive gear 200 and clutch member 204. The synchronization of the gear 200 and the clutch member 204 is also aided by the action of the spring 44, which to a degree collapses as the synchronizing operation is being effected. It should also be noted that this action of the spring 44 permits the diaphragm to continue the movement to the right, while the synchronizing operation is taking place. Furthermore, a free-wheeling unit may be incorporated in the transmission system to facilitate this operation, and it should be remembered that if the vehicle is provided with a fluid clutch such yieldable coupling will also facilitate these operations of the transmission.

The high gear setting of the transmission 10 having been established by releasing the accelerator sufficiently to energize the motor by vacuum, the driver will then depress the accelerator to maintain or increase the speed of the vehicle. However, the diaphragm 34 and linkage connected thereto will not be power operated by the spring 90 to again place the transmission in low gear until the accelerator is fully depressed to close the switch 26; for it will be remembered that once the diaphragm 34 is moved to its high gear position, disclosed in Figure 9, the latch 100 fitting within the groove 239 serves to hold the diaphragm in said position until the solenoid 94, which is controlled by the switch 26, is again energized to move the latch out of the groove.

We will now assume that the vehicle is driven into hilly country and the driver fully depresses the accelerator in order to increase the driving torque of the engine and thereby maintain a relatively high vehicle speed or increase the speed of the vehicle to make it unnecessary to shift gears. As to the latter operation, it is assumed that a manually operated two-speeds forward and reverse transmission is combined with the automatically operated two-speeds forward transmission disclosed in Figure 1. Now, obviously, it is best not to so unduly tax the engine, and with the mechanism of our invention such an operation is unnecessary for the transmission 10 is automatically operated to lower the driving ratio between the engine and the driving wheels of the vehicle, that is, establish the low gear setting of the transmission. If the vehicle is also equipped with a manually operated transmission, this operation of the transmission 10 makes it unnecessary to shift the gears of the manually operated transmission.

Describing this operation, when the accelerator is fully depressed, a stop 241, fixedly mounted on the link 104, moves into contact with the end portion of the bell crank lever 110 just before the throttle 102 reaches its fully open position. Accordingly, the final increment of the throttle opening movement of the accelerator serves to close the switch 26, thereby again energizing the solenoid 94. The armature 160 of the solenoid is thus again drawn upwardly against the tension of the spring 228, and the valve 98 is again moved upwardly to the position disclosed in Figure 5. As previously described, this operation results in a venting of the motor compartment 91 of the atmosphere.

The venting of the compartment 91 will permit the compressed spring 90 to again move the diaphragm 34 to the left, provided the latch 100 is lifted out of the groove 239 in the member 38. However, this operation of the latch is effected when the solenoid 94 is energized, for, as disclosed in Figures 5 and 8, when the armature 160 moves upwardly a short distance a disc 242, secured to the end of a pin 244, contacts the inwardly directed ends of upwardly projecting end portions 246 and 248 of the latch. The body of the latch, which is preferably of spring steel, is wrapped, at one end thereof, about a pin 250 secured to the side walls of the casing 82 and is then extended at 252 and fixedly secured to the bottom of the casing 92. Continued upward movement of the armature 160 serves to lift the end portion 254 of the latch out of the groove 239, thereby permitting the spring 90 to move the diaphragm 34 to the left to the position disclosed in Figure 5. The low speed setting of the transmission is thus established, the friction disc 220 serving to synchronize the speeds of the clutch 204 and the second-speed gear 194.

Stressing an important feature of my invention, the strength of the spring 228 is such that the energized solenoid will readily overcome said spring. In fact, the armature 160 and the parts connected thereto move so fast that the lost motion between the disc 242 and the bent ends of the members 246 and 248 is quickly taken up and the latch is moved out of the groove very quickly.

Describing now one of the most important features of my invention, that is, the cycle of operations effected by the expanding spring 90 as a power means, during the first increment of movement of the spring operated diaphragm 34, the lost motion in the force-transmitting linkage interconnecting the diaphragm and the shiftable member 196 is taken up, for all such linkage is subject to appreciable wear and tear, resulting in lost motion between the several parts thereof: and there is always some lost motion in this linkage when the original installation is made and despite every effort to make a tight fit. As this lost motion is being taken up, the switch member 38 is being moved to the left sufficiently to bring one end of the switch operating portion 76 of said member into contact with the ball 78 of the interrupter switch 22. Such contact results in moving the ball sufficiently to close said switch. The construction and arrangement of the parts, including the depth and length of the groove 240 and the position of the ball 78 within the groove in the latched position of the member 38, are such as to insure a closing of the switch 22 at the same time the movement of the member 196 is initiated. When the switch 22 is closed, the electric ground connection to the breaker switch 147 is completed, for at this time the driver is maintaining the switch 26 closed by maintaining the accelerator depressed. The current flowing from the primary coil 28 to the breaker switch 147 is thus appreciably reduced. In fact, it is so reduced as to disable the distributor and cut the ignition system out of operation.

The disabling of the ignition system, of course, renders the internal-combustion engine inoperative as a source of power, thereby reversing the driving torque. In other words, the moving vehicle then drives the shaft 14, and the shaft 12 slows down due to cutting the engine out of operation. This operation, that is, the operation of rendering the engine inoperative, facilitates the operation of demeshing the teeth 208 and 226, for the latter teeth are no longer being forced into driving contact with the teeth 206. If through error the parts are so constructed and arranged as to fail to effect the aforementioned operation, resulting in an initiation of the movement of the member 196 before the switch is closed, the presence of the fluid clutch, a yieldable connection, will facilitate a demeshing of the teeth 208 and 226. It also follows that if, instead of the change-gear transmission 10, some other type of transmission is used, disabling the internal-combustion engine and reversing the driving torque will facilitate an uncoupling operation of the driving and driven elements of the transmission; and such a disabling operation will facilitate a demeshing of the gears even though the fluid clutch be omitted and the connection of the engine with the transmission be effected only by a manually operated clutch.

Continuing the description of the cycle of operations, as the diaphragm moves to the left, the construction and arrangement of the parts, including the length of the switch operating portion 76, is such that the switch 22 remains closed to effect a disabling of the engine until the resistance to movement encountered by the shiftable member 196 is substantially reduced. This resistance is so reduced that when and not until the friction discs 220 and 221 have completed their functions of equalizing the speeds of the second-speed gear 194 and the shiftable member 196 the spring 90, which is a yieldable member, facilitates this operation. The end portion 76 moves out of contact with the ball 78 to thereby open the switch 22, just as the member 196 starts its final increment of movement to the left, to mesh the teeth 206 and 227. The opening of the switch 22 results in restoring the ignition system to operation. Accordingly, the operation of the engine is resumed at the same time that the teeth 206 and 227 are being meshed. This is, however, exactly the operation desired, for speeding up the engine obviates the undesirable deceleration or surge of the vehicle that would result if the vehicle picked up the load of a dead engine.

The function of the groove 240 is to be particularly stressed, for by virtue of this groove the initiation of the ignition interruption operation is delayed until the slack in the system is taken up, and the above-described demeshing operation is initiated. This delay results in reducing the length of time during which the ignition is interrupted. It is, of course, desirable to make this period of interruption just as short as possible, for otherwise the intake and exhaust manifold of the engine may fill up with unburnt combustible gas, which will result in a back fire when the operation of the ignition system is resumed.

Completing the description of the operation of the mechanism constituting our invention, after placing the transmission 10 in low gear by depressing the accelerator to its wide open throttle position, the driver will probably keep the accelerator in this position until the vehicle has reached the top of the hill. If this operation is effected on level ground, the driver will probably maintain the accelerator depressed until the desired vehicle speed is obtained. Upon releasing the accelerator, the transmission will remain in low gear, as previously described, until the accelerator is released sufficiently to again energize the motor 35 to effect a high gear setting of the transmission. When bringing the vehicle to a stop the governor 18 will close the switch 24 to effect a low gear setting of the transmission, this operation taking place at relatively low vehicle speed, depending, of course, upon the setting of the governor.

There is thus provided a simple and compact transmission operating and ignition controlling power means, including a pressure differential and spring operated motor. This power means is operable, after the accelerator is fully depressed or after the speed of the vehicle is reduced below a predetermined factor, to successively take up slack in the connection between the power element of the motor and the transmission, then disable the internal-combustion engine, thereby reversing the driving torque in the power transmission system of the vehicle, and at the same time, aided by the operation of a fluid clutch, operate the transmission to uncouple the driving and driven elements thereof, then, with the aid of the fluid clutch, continue the operation of the transmission to effect a synchronization of the driving and driven parts thereof and, lastly, restore the engine to operation as the transmission is being operated to effect the low speed ratio setting thereof. Upon release of the accelerator and above a predetermined vehicle speed, the power means functions to again place the transmission in high gear.

While one illustrative embodiment has been described, it is not my intention to limit the scope of the invention to that particular embodiment, or otherwise than by the terms of the appended claims.

I claim:

1. In a motor vehicle provided with an internal combustion engine, an accelerator, an engine controlling ignition system and a change-speed transmission, power means for operating the transmission and in part controlling the operation of the ignition system to facilitate a certain operation of the transmission, said power means including a motor casing, a pressure differential and spring operated power element housed within said motor casing and operably connected to a torque transmitting element of the transmission, a control valve, a solenoid for operating said valve, an ignition interrupter switch, switch operating force transmitting means connected with the power element, and electrical means cooperating with said switch to provide a means for cutting the ignition system into or out of operation and for controlling the operation of the solenoid, said electrical means including an accelerator operated switch and a governor operated switch, the parts of the power means being so constructed and arranged and so operative as to effect, after the accelerator is depressed sufficiently to close the switch operated thereby or after the governor operated switch is closed, a movement of the power element in one direction to move said torque transmitting element to thereby uncouple said element from another torque transmitting element of the transmission and at the same time render the electrical means, including the ignition interrupter switch, operable to cut the ignition system out of operation and thereby facilitate said uncoupling operation, the continued movement of the power element then serving to couple the aforementioned movable torque transmitting element with another torque transmitting element of the transmission to establish a certain drive ratio setting of the transmission and effect a cut-in operation of the ignition system immediately prior to the completion of the last mentioned operation of the transmission.

2. In a motor vehicle provided with an internal combustion engine, an accelerator, an engine controlling ignition system, a change-speed transmission and a fluid clutch interposed between the engine and transmission, power means for operating the transmission and in part controlling the operation of the ignition system to facilitate a certain operation of the transmission, said power means including a motor casing, a pressure differential and spring operated power element housed within said motor casing and operably connected to a torque transmitting element of the transmission, a control valve, a solenoid for operating said valve, an ignition interrupter switch housed within the motor casing, a switch operating force transmitting means connected with the power element and electrical means cooperating with said switch to provide a means for cutting the ignition system into or out of operation and for controlling the operation of the solenoid, said means including an accelerator operated switch and a governor operated switch, the parts of the power means being so constructed and arranged as to effect, when the accelerator is released to open the switch operated thereby, to reverse the engine torque and to make possible a partial evacuation of the intake manifold of the engine and a resultant movement of the power element in one direction to effect a certain operation of the transmission, said operation being facilitated by a slipping operation of the fluid clutch after the accelerator is released, and the parts of the power means being also so constructed and arranged as to effect, after the accelerator is depressed sufficiently to close the switch operated thereby or after the governor operated switch is closed, a movement of the power element in another direction to move said torque transmitting element to thereby uncouple said element from another torque transmitting element of the transmission and at the same time render the electrical means, including the ignition interrupter switch, operable to cut the ignition system out of operation to facilitate said uncoupling operation, said uncoupling operation, of the torque transmitting elements being facilitated by a slipping operation of the fluid clutch.

3. In an automotive vehicle provided with a battery, an internal combustion engine, a change-speed transmission, a transmission operating crank means interconnecting the engine and transmission including a fluid clutch operable to facilitate a power operation of the transmission, an ignition system constituting part of means for controlling the operation of the engine and an accelerator, power means for operating the transmission and for momentarily disabling the ignition system to facilitate a certain power operation of the transmission, said power means including an accelerator operated switch, a spring and pressure differential operated motor including a power element, a motor controlling valve, a solenoid for operating said valve, means interconnecting the power element with a torque transmitting element of the transmission, an ignition interrupter switch operated by the power element of the unit and housed within said motor, means connected with the power element and housed within said motor for operating said switch, electrical means interconnecting the interrupter switch with the primary winding of the ignition system and the accelerator operated switch and also interconnecting the valve operating solenoid with the battery and the accelerator operated switch, and air transmitting means interconnecting the motor unit with the intake manifold of the engine, the parts of the aforementioned mechanism being so constructed and arranged and so operative that when the accelerator is released to operate the solenoid controlling switch operated thereby and to close the throttle of the engine to effect a partial vacuum within the intake manifold, the motor unit is energized to rotate the transmission operating crank, said operation of the unit being facilitated by the operation of the fluid clutch and when the accelerator is depressed to its full open position the switch operated thereby is operated to effect a certain operation of the solenoid, thereby operating the valve to effect a spring operation of the motor unit to again rotate the transmission operating crank, said latter operation of the unit being facilitated by the operation of the fluid clutch and a momentary disabling of the ignition system effected by a momentary closing of the ignition interrupter switch.

4. In an automotive vehicle provided with an internal combustion engine, an accelerator, an engine controlling ignition system, a change-speed transmission, and a fluid clutch constituting a part of means interconnecting the engine and transmission and operative to facilitate a power operation of the transmission, ignition controlling means including a power operated ignition interrupter swich for cutting the ignition system into and out of operation when the transmission is being operated to establish the same in a certain setting and an accelerator and vehicle speed responsive governor controlled power means for operating the transmission and said interrupter switch for cutting the ignition system into and out of op- to effect one operation of the transmission, to take up the usual slack in the connection between a torque transmitting element of the transmission and the power element of the power means and to momentarily disable the ignition system and also being operative, in cooperation with the fluid clutch, to effect another operation of the transmission, said latter operation being initiated by releasing the accelerator when the speed of the vehicle is above a predetermined factor.

5. In an automotive vehicle provided with a power transmission system including an engine controlling throttle, an internal combustion engine, an engine controlling throttle, an ignition system for in part controlling the operation of said engine, a change-speed transmission, a transmission operating crank, a vehicle speed responsive governor and a fluid clutch constituting a part of means coupling said engine and transmission and operative to facilitate a power operation of the transmission, power means, including a motor unit operably connected with the crank, for operating the transmission and in part controlling the operation of the ignition system, and a spring returned manually operated means for so opening and closing the throttle and controlling the operation of the fluid clutch and said power means as to successively effect, when said manually operated means is moved to its limit in one direction, an opening of the engine throttle, a slack take-up operation of the means interconnecting the power element of the motor unit and the crank, a disabling of the ignition system and a concurrent demeshing operation of the change-speed transmission and lastly a resumption of operation of the ignition system just prior to the completion of the movement of the crank and to thereafter successively effect, when the speed of the vehicle reaches a predetermined factor and upon releasing the manually operated means to return the same to its off position, a closing movement of the engine throttle and another operation of the crank.

References Cited in the file of this patent

UNITED STATES PATENTS

| | | |
|---|---|---|
| 1,185,528 | Oddie | May 30, 1916 |
| 1,766,510 | Gregory | June 24, 1930 |
| 2,051,553 | Fleischel | Aug. 18, 1936 |
| 2,056,006 | Hodgkins | Sept. 29, 1936 |
| 2,092,580 | Kelley | Sept. 7, 1937 |
| 2,214,099 | Claytor | Sept. 10, 1940 |
| 2,214,100 | Claytor | Sept. 10, 1940 |
| 2,225,493 | Barnes | Dec. 17, 1940 |
| 2,231,876 | Beltz | Feb. 18, 1941 |
| 2,236,657 | Webb | Apr. 1, 1941 |
| 2,238,746 | Neracher et al. | Apr. 15, 1941 |
| 2,322,479 | Schjolin | June 22, 1943 |
| 2,333,668 | Neracher et al. | Nov. 9, 1943 |